Dec. 30, 1930.	J. H. REICHART	1,786,507
CORN POPPER
Filed March 30, 1929
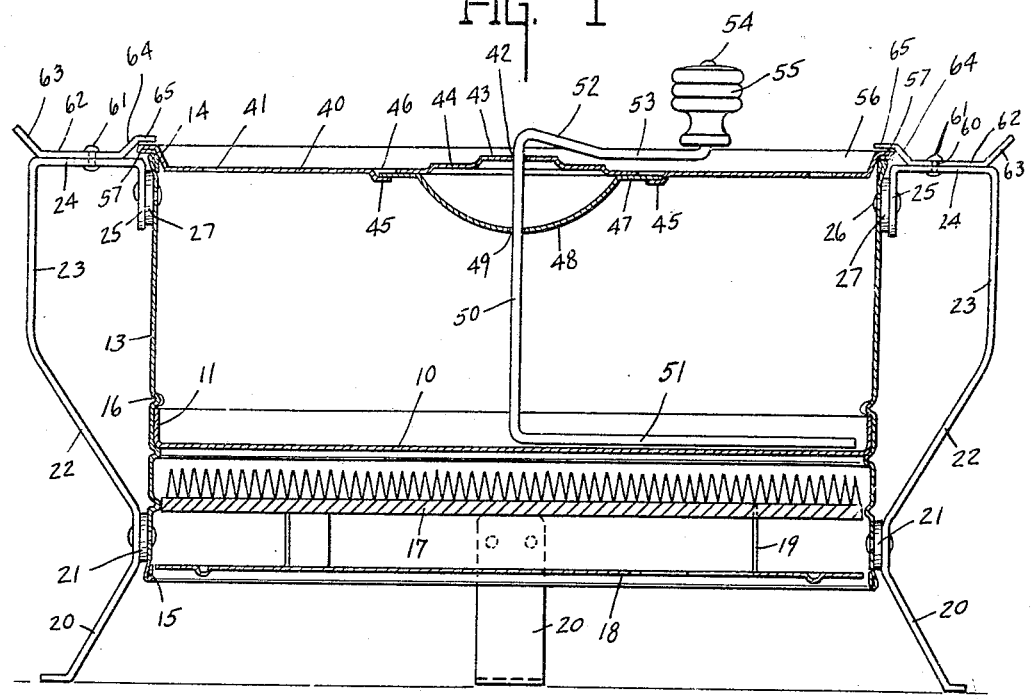
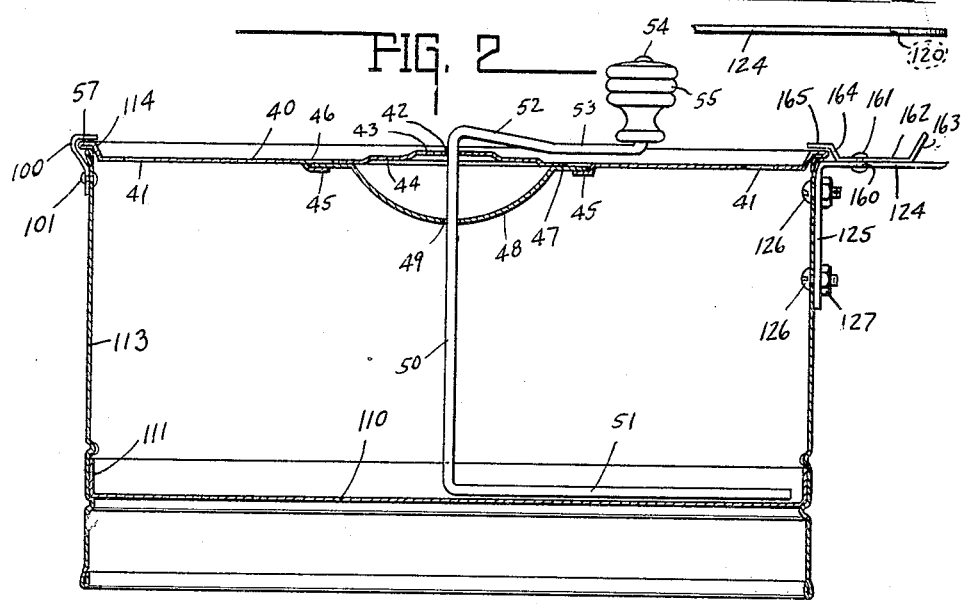
INVENTOR.
JAMES H. REICHART.
BY
ATTORNEYS.

Patented Dec. 30, 1930

1,786,507

UNITED STATES PATENT OFFICE

JAMES H. REICHART, OF MUNCIE, INDIANA

CORN POPPER

Application filed March 30, 1929. Serial No. 351,186.

This invention relates to a covered vessel such as a corn popper or the like.

One object of this invention is to provide a covered vessel such as a corn popper with a supporting handle and associating therewith a lock for the cover of that vessel.

Another object of the invention is to provide a covered vessel such as a corn popper or the like with an agitator supported by the cover and arranged for satisfactory operation under severe operating conditions.

The full nature of the invention will be more fully understood from the accompanying drawings and the following description and claims:

In the drawings Fig. 1 is a central sectional view through one form of corn popper. Fig. 2 is a similar view of a modified form thereof.

In Fig. 1 of the drawings 10 indicates a heating plate with an upturned flange or skirt 11. Said plate rests upon a flange 12 or annular ribbing indented in a side 13. The side 13 is provided at its upper edge with a bead 14 and its lower edge is similarly formed as at 15. A plurality of indented portions 16 lock the heating plate to the side wall. Positioned between the heating plate 10 and an insulation plate 17 is an electrical heating element 110. Said insulation plate 17 suitably supports in spaced relation a bottom plate 18 through the instrumentalities 19 integral or otherwise secured to said plate. Plate 18 serves as a bottom closure plate.

A pair of straps 20 are suitably secured to the side wall 13 and serve as feet. Two of the feet are insulated through a heat resisting member 21 from the side wall and include upward extensions that extend outwardly as well. The same include inclined portions 22 and vertical portions 23. An inturned end 24 includes a down turned portion 25 that is secured as at 26 to the side wall 13 adjacent the bead 14 and is thermally insulated as at 27 similar to the insulation 21. The aforesaid constitutes a relatively cool metal handle.

A cover 40 has a series of peripheral holes 41 formed for ventilation and for the escape of heat. The cover is centrally apertured as at 42 and includes a series of progressively embossed portions 43 and 44. This raises the plane of the aperture 42 above the plane of the cover 41. A plurality of tongues 45 are struck downwardly from the cover as at 46 and the same rigidly mounts a bearing forming plate 47 including a substantially semi-spherical intermediate portion 48 centrally apertured as at 49. The openings 42 and 49 form a pair of spaced bearings for a shaft 50.

Shaft 50 has a lateral extension 51 positioned adjacent the heat plate 10 and adapted to ride over the same. The opposite and outer end of the shaft is turned downwardly as at 52 and then laterally as at 53 forming a crank. The free end is turned vertical so as to lie parallel to the shaft 50 and is enlarged as at 54 to retain a finger piece or knob 55 thereon. Rotation of shaft 50 rotates the agitator 51 and prevents sticking or burning of the popped corn or pop corn grains.

The cover at its outer edge is turned upwardly as at 56 forming a seat and the free end is turned inwardly to form a smooth bead or flange 57. In this wise the cover is seated or nested in the top of the corn popper. The handle portion 24 is apertured as at 60 and extending therethrough is a rivet 61 or the like which pivotally supports a strap 62 having an angular upturned finger engageable portion 63 whereby said strap may be tilted upon said rivet. The strap 62 has an upturned portion 64 at the opposite end and the same terminates in a parallel extension 65 which overlies the flange 57 of the cover. In this wise the cover may be clamped to the side of the popper.

In Fig. 2 a modified form of the invention is illustrated. The cover is identical and therefor a description thereof will be omitted. In this form of the invention the side wall 113 supports the heating plate 110, having the upturned flange or skirt 111 in identically the same manner as that set forth for the modification previously described. This form of popper is suitable for positioning over coals, a gas burner, or similar stove so that the heat passes upwardly through the side wall 113 to beneath the heating plate 110 and engages thereon for heating the contents.

Rigidly secured at one point near the bead 114 is an angular clip member 100 riveted as at 101, and the same forms a groove or catch for the beaded edge 57 of the cover 40. Suitably secured to the side 113 is a parallel strap portion 125, herein a plurality of bolts and nuts 126 and 127 respectively rigidly connecting the two together. Lateral portion 124 is connected at one end to the upper end of the parallel portion 125 and is elongated and same terminates in an apertured end, see 120. This is a construction similar to a pan or skillet. The lateral portion 124 is apertured as at 160, the same receiving a rivet 161 which pivotally supports a strap portion 162 having the angular finger engageable portion 163, and the cover clamping portion 165 offset from the parallel portion 162 through the angular portion 164.

The invention claimed is:

1. The combination with a chamber and a cover therefor, of a handle comprising a strap having an end secured to the chamber adjacent the cover support and extending upwardly to the plane of the cover, an outward extension handle forming portion secured thereto and arranged for chamber support, and a cover lock pivotally supported by the outward extension immediately adjacent the chamber and cover connection.

2. A device as defined by claim 1 characterized by the lock comprising a U-shaped member, one arm of which constitutes a finger piece, the midportion being pivotally mounted, and a cover engaging extension carried by the opposite arm.

3. A device as defined by claim 1 characterized by the chamber supporting strap outward extension being directed downwardly and inwardly for leg formation.

4. A device as defined by claim 1 characterized by the chamber supporting strap outward extension being directed downwardly and inwardly for leg formation and secured to the chamber near the base thereof.

5. A device as defined by claim 1, characterized by the lock comprising a U-shaped member, one arm of which constitutes a finger piece, the midportion being pivotally mounted, and a cover engaging extension carried by the opposite arm, said chamber supporting strap outward extension being directed downwardly and inwardly for leg formation.

6. A device as defined by claim 1 characterized by the lock comprising a U-shaped member, one arm of which constitutes a finger piece, the midportion being pivotally mounted, and a cover engaging extension carried by the opposite arm, said chamber supporting strap outward extension being directed downwardly and inwardly for leg formation and secured to the chamber near the base thereof.

In witness whereof, I have hereunto affixed my signature.

JAMES H. REICHART.